United States Patent
Denekas

[11] 3,753,465
[45] Aug. 21, 1973

[54] METHOD FOR CONTROLLING THE VISCOSITY OF SURFACTANT SOLUTIONS

[75] Inventor: Milton O. Denekas, Houston, Tex.

[73] Assignee: Esso Production Research Company

[22] Filed: Nov. 22, 1971

[21] Appl. No.: 201,089

[52] U.S. Cl.................. 166/252, 166/275, 166/273
[51] Int. Cl............................................. E21b 43/22
[58] Field of Search............... 166/273–275, 250, 166/252; 252/8.55 D

[56] References Cited
UNITED STATES PATENTS

| | | | |
|---|---|---|---|
| 3,653,437 | 4/1972 | Gale et al. | 166/275 X |
| 3,302,713 | 2/1967 | Ahearn et al. | 166/275 X |
| 3,348,611 | 10/1967 | Reisberg | 166/275 |
| 3,361,313 | 1/1968 | Riggs, Jr. et al. | 166/275 X |
| 3,480,080 | 11/1969 | Murphy | 166/275 X |
| 3,491,834 | 1/1970 | Ahearn et al. | 166/273 |

Primary Examiner—Stephen J. Novosad
Attorney—James A. Reilly et al.

[57] ABSTRACT

A method of recovering oil from a subterranean formation using an aqueous surfactant solution with a predetermined and controlled viscosity. The ability of the surfactant composition to impart viscosity to the aqueous solution is dependent upon the weight ratio of hydrocarbon oil in the composition to the surfactants in the composition. This oil/surfactant weight ratio must be maintained within the range of 0.05 to 0.40 to obtain a surfactant composition having the ability to impart a desired viscosity to its aqueous solution. The ratio can be maintained within this range and varied in value to change the viscosity-imparting properties of the surfactant composition by adjusting the deoiling process during the manufacture of the surfactant composition or by adding hydrocarbon oil to the surfactant composition.

6 Claims, 1 Drawing Figure

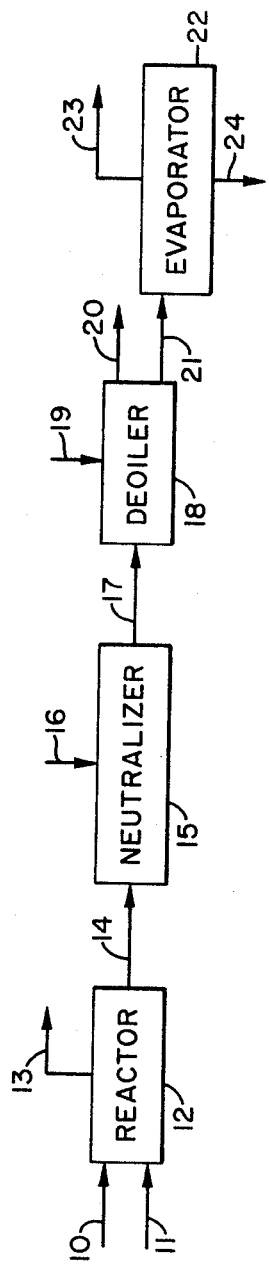

METHOD FOR CONTROLLING THE VISCOSITY OF SURFACTANT SOLUTIONS

BACKGROUND OF THE INVENTION

1. Field of the Invention

This invention relates to a process for recovering oil from a subterranean formation. The invention also relates to a method for controlling the viscosity of an aqueous solution used to recover oil from a subterranean formation. This invention further relates to a method of manufacturing surfactants having predetermined viscosity-imparting properties.

2. Description of the Prior Art

The petroleum industry has recognized for many years that only a portion of the original oil in place in an oil reservoir can be produced by natural mechanisms. It is also well known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most economical and widely practiced of secondary recovery methods. In such a process, water is introduced through injection wells to drive oil through the formation to offset producing wells. Much of the current work in secondary recovery technology has been directed toward improving the efficiency of waterflooding processes.

Surface active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. It has been suggested that, because the normal interfacial tension between the reservoir oil and water is so high, these discrete droplets are unable to deform sufficiently to pass through narrow constrictions in the pore channels. When surface active agents are added to the flooding water, they lower the interfacial tension between the water and the reservoir oil and permit the oil droplets to deform and flow with the flood water. It is generally conceded that the interfacial tension between the flood water and the reservoir oil must be reduced to less than 0.1 dyne/cm for effective recovery.

While conventional waterflooding and surfactant waterflooding may be effective in obtaining additional oil from subterranean oil reservoirs, these processes have a number of shortcomings which reduce their ability to recover oil. Foremost among these shortcomings is the tendency of the injected fluid to finger through the reservoir and to bypass substantial portions of oil. In other words, as the injected fluid travels through the reservoir between injection wells and production wells, it contacts less than the total volume of the reservoir within the injection well-production well pattern. The fraction of the volume of the reservoir that is swept by injected fluid is termed the "sweep efficiency" and is expressed as a percentage of the total reservoir volume in the pattern. The sweep efficiency of a typical conventional waterflood or surfactant waterflood may typically be less than 75 percent when the flooding operation reaches its economic limit. Thus, one quarter or more of the reservoir may not have been contacted by the injected fluid at the end of the operation. The low sweep efficiency of these operations is usually explained by the fact that the injected fluid has the ability to move through the reservoir at a much faster rate than the oil which it is displacing. The fingering and bypassing tendencies of the injected fluid are due in part to its relatively low viscosity.

The sweep efficiency of a flooding operation is dependent in part on the mobility ratio of the flooding system. The mobility ratio is a methematical expression which relates fluid and formation rock properties and which expresses the relative mobilities of the oil and of the driving water in a flooding operation. When the mobility ratio equation is applied to a typical waterflooding operation it is expressed as:

$$M_o/M_w = \mu_w/\mu_o \times K_o/K_w$$

where $M_o$ = mobility of the oil in the reservoir in question;
$M_w$ = mobility of the driving water in the reservoir in question;
$\mu_w$ = viscosity of the driving water;
$\mu_o$ = viscosity of the oil;
$K_o$ = relative permeability of the reservoir to the oil in the presence of residual water;
$K_w$ = relative permeability of the reservoir to water in the presence of residual oil;

This equation is perhaps best explained by stating that when the mobility ratio of oil to water is equal to one the oil and the water will move through the reservoir with equal ease. When the mobility ratio is less than one, there will be a tendency for the water to bypass the oil and finger to the producing well. Naturally, when the mobility ratio is low the sweep efficiency will also be low.

The mobility ratio is related to the viscosities of the flooding fluid and the reservoir oil. The viscosities of reservoir crude oils can vary considerably. Some crudes might have viscosities as low as one or two centipoises and others range up to a thousand centipoises or even greater. However, the vast majority of reservoir crude oils which are capable of being recovered by conventional or surfactant waterflooding have viscosities in the range of two to ten centipoises at reservoir temperature and pressure. It should be readily apparent from the mobility ratio equation that, if a surfactant waterflood with a viscosity of approximately one centipoise is used to displace oil having a viscosity of five centipoises, there will be a tendency for the flood water to finger through the reservoir oil. This, of course, will result in a relatively poor sweep efficiency and a considerable portion of the reservoir oil may never be contacted by the surfactant flood water. It has, in fact, generally been noted that surfactant waterflooding performs less satisfactorily with viscous crude oils than with relatively nonviscous oil.

A number of procedures have been suggested to date for improving conventional and surfactant waterflooding to reduce the degree of fingering and bypassing and to increase the sweep efficiency. One suggestion has been to increase the viscosity of the flood water by incorporating watersoluble, viscosity-imparting agents in the water. Materials that have been suggested for this purpose include a wide variety of gums, sugars, polymers and certain sulfonated hydrocarbons. While these materials are effective to an extent in increasing the viscosity of flood water they are also characterized by serious disadvantages. For example, some of the materials have a tendency to plug formations; some are relatively unstable; some have relatively little thickening effect; and none of the materials has the ability to lower the interfacial tension between the oil and water to desired levels. Additionally, many of these materials are quite expensive and their use is not feasible from the standpoint of economics.

A recent U.S. Patent Application "Viscous Surfactant Waterflooding"; Hopkins, Lederman, and Murray; (Ser. No. 148,127 filed May 28, 1971; a continuation of Ser. No. 845,126, filed July 23, 1969; now abandoned) describes a new surfactant composition which has the dual ability of increasing the viscosity of the flood water and of radically lowering the interfacial tension between the reservoir oil and flood water. These dual purpose surfactant compositions are effective oil recovery agents. They are inexpensive, they lower the interfacial tension to desirable levels and they substantially increase the viscosity of the flood water. However, there is a need for means of controlling the viscosity of solutions of these surfactants while retaining a low interfacial tension. The viscosity of such solutions may be higher or lower than the value desired for particular application.

Generally speaking, an increase in the viscosity of the surfactant flood water will improve oil recovery. However, an increase to a particular desired level can be vitally important to the efficiency of the recovery. In other words, an increase in the viscosity of the flood water may be beneficial, but unless this increase is brought within the desired limits the recovery process cannot be conducted under optimum conditions. Where the increased viscosity is still too low there will be a tendency for that fluid to finger through the oil and to inefficiently sweep the reservoir. Where the increased viscosity is too high, excessive energy will be used in displacing the surfactant solution through the reservoir. Moreover, where the viscosity of the surfactant solution is higher than that of the fluid which displaces it, e.g., flood water, there will be a tendency for viscous fingering to occur at the trailing edge of the surfactant solution bank. Control of the viscosity level is therefore of paramount importance to an efficient displacement of reservoir oil.

It has previously been suggested that the viscosity of aqueous solutions of these dual purpose surfactants can be controlled by varying the ratio of water-insoluble/pentane-insoluble sulfonates in the surfactant mixture. It has been found that when the weight ratio of these sulfonates lies within the range of 0.01 to 0.30 the resultant aqueous surfactant solution will have desirable viscosities and improved oil recovery properties. While variation of the sulfonate ratio is an effective method of controlling the viscosity of the surfactant solution, the need exists for other methods of varying and controlling the viscosity of aqueous solutions of these dual purpose surfactants.

SUMMARY OF THE INVENTION

This invention relates to a method of recovering oil from a subterranean oil-bearing formation. A surfactant composition is prepared by sulfonating a hydrocarbon oil, preferably in a thin-film reactor. Deoiling of the reaction product is controlled to maintain the weight ratio of oil to surfactant within the range of 0.05 to 0.40. Alternatively, additional quantities of the hydrocarbon oil feedstock or an oil having a similar composition may be added to the reaction product.

The objects of this invention will be apparent from the following drawing and discussion of the preferred embodiment.

BRIEF DESCRIPTION OF THE DRAWING

The FIGURE is a schematic flow diagram of a process for manufacturing the surfactants of this invention.

DESCRIPTION OF THE PREFERRED EMBODIMENT

This invention has general applicability to adjusting and controlling the viscosity of aqueous solutions of anionic surfactants. However, the results of the practice of this invention are most pronounced when used with the dual purpose sulfonated surfactants previously discussed. Therefore, this invention will be described with primary reference to this preferred class of surfactant composition.

It has been found that the viscosity-imparting properties of the dual-purpose surfactant compositions are related, at least in part, to the relative amounts of certain components in the surfactant product. These viscosity-controlling components are the oil and the surfactants, both water-insoluble and pentane-insoluble sulfonates. These components will be defined and discussed in greater detail hereinafter. It has further been found that the relative amounts of these constituents can be varied, and thus the viscosity-imparting properies of the surface active agents can be controlled by regulating the operating conditions during the manufacture of the product.

Prior to discussing the method of determining the constituents of the surfactant product, the effect of the oil/surfactant weight ratio on the viscosity of an aqueous solution of the product and the method of controlling the value of this ratio within desirable limits, it may be helpful to review the general method for producing these dual purpose surfactants as disclosed in U.S. Patent No. 148,127. The method of manufacturing these dual purpose surfactants is set forth in detail in that patent application and that disclosure is incorporated by reference herein. However, for background and convenience, a general description of the method of producing such surfactants will be given.

These dual purpose surfactants are prepared by sulfonating certain hydrocarbon feedstocks under specified sulfonating conditions. The preferred source of feedstock hydrocarbons is a 700°–1100°F boiling range fraction of a petroleum crude. Such fractions are known generally in the art of petroleum refining as "lube oil distillates" and may be identified by the ASTM Standard Method of Distillation, D 1160-61.

As set forth in Patent Application Ser. No. 148,127, the feedstocks can be obtained from a variety of sources. The source may be a virgin distillate, an unrefined petroleum crude, or a distillate which has been subjected to further refining steps such as hydrofining, dewaxing, or solvent extraction. All of these feedstocks are satisfactory for producing the dual purpose surfactant so long as they contain at least ten percent by volume of the sulfonatable constituents present in a 700°–1100°F boiling range fraction of a petroleum crude.

The FIGURE will further illustrate the process of manufacture of these dual purpose surfactants. Turning to this drawing, a suitable petroleum feedstock in line 10 and a sulfonating agent, such as gaseous $SO_3$ and air, in line 11 are introduced into the sulfonation reactor 12 where a portion of the petroleum feed is converted into sulfonic acids. Waste gases containing primarily sulfur dioxide, sulfur trioxide, oxygen and nitrogen are discharged by way of vent line 13. The temperature of the reactor effluent may vary broadly from 150° to 375°F. This reactor temperature will be governed primarily by the viscosity of the feedstock, the reactor design and the desired flow rate of feedstock through the reactor. Generally, reaction temperatures of from about 250° to 325°F are preferred.

The gaseous sulfur trioxide is introduced into the hydrocarbon feedstock in an inert diluent gas, such as air or nitrogen. Sulfor trioxide will preferably be from about 5 to 8 percent by volume of the total gaseous feed volume. This percentage is not critical, however, and may vary from as low as 0.5 percent up to approximately 25 percent by volume. The diluent gas should be dried before the sulfur trioxide is introduced to prevent reaction between sulfur trioxide and water vapor.

The treat ratio for the process expresses the relationship between the quantity of sulfur trioxide and the quantity of hydrocarbon feed introduced into the reactor and is expressed as the number of pounds of sulfur trioxide per 100 pounds of hydrocarbon feed. This treat ratio may vary between 5 and 30 pounds of $SO_3$ per 100 pounds of hydrocarbon feedstock but preferably is about 20 pounds per hundred.

The average period of time that the sulfonatable material remains in the reactor is termed the "residence time". Short residence times are preferable; approximately 1 second to 5 seconds generally produced superior products. However, the residence time depends primarily on the configuration of the reactor and may vary broadly. In certain instances, the residence time may be several minutes without adverse results.

The hydrocarbon feed stream and the gaseous $SO_3$ may be preheated before introduction into the reactor. These increased temperatures will speed the reaction and lower the viscosity of the hydrocarbon feedstock. The preferred feedstocks for producing these dual purpose surfactants are normally maintained at a temperature of from 150° to 210°F.

Thin-film reactors are the preferred type of sulfonation reactor to produce these dual purpose surfactants. Such reactors include the "falling film" reactors such as shown in British Pat. No. 1,111,208 and German Pat. No. 1,195,299. Wiped-film reactors are another type of this general class and are typified by the reactor disclosed in U. S. Pat. No. 3,427,342. These thin-film reactors including the falling film and wiped-film types have the common feature of means for producing a very thin film of hydrocarbon liquid within the reaction zone. Gaseous $SO_3$ in the diluent gas passes across this film and induces turbulence in the film to promote rapid reaction and rapid transfer of heat from the interior of the reactor to its exterior.

After the desired degree of sulfonation the reactor effluent is withdrawn by means of line 14 and comprises a mixture of sulfonic acids, unreacted hydrocarbon feedstocks, and minor amounts of unreacted gaseous $SO_3$. The mixture is then introduced into neutralizer 15 where it is neutralized by an aqueous solution of base from line 16. Neutralization of these sulfonic acids is a conventional technique and many bases both organic and inorganic may be employed. The preferred bases for neutralization are ammonia and sodium hydroxide. Generally, enough base is added to bring the pH to about 9–11 and neutralization temperatures normally range from 60°–210°F.

The neutralized product is withdrawn by means of line 17 and introduced into the deoiling chamber 18. In the preferred method of this invention, the operating conditions in the deoiling chamber 18 are controlled to remove a desired amount of unreacted oil from the neutralized product and to leave a desired quantity of unreacted oil in the neutralized, deoiled sulfonation product.

The removal of unreacted oil from surfactants produced from petroleum feed streams is conventional and a number of deoiling methods may be suitably employed in the practice of this invention. However, a single solvent process using isopropyl alcohol is preferred. Isopropyl alcohol is introduced through line 19 to the deoiling chamber 18. The isopropyl alcohol will mix with the neutralized product and create two phases. The upper phase will primarily consist of unreacted oil with minor amounts of isopropyl alcohol, sulfonated surfactants and water. The lower phase will contain sulfonated hydrocarbons, most of the added isopropyl alcohol, inorganic salts, minor quantities of unreacted oil, and water resulting from the aqueous base solution used in the neutralization step. The total volume of alcohol-water should be approximately equal to or slightly greater than the volume of the other constituents of the mixture. If insufficient water is present from the neutralization to give this equal volume additional water may be introduced with the alcohol through line 19.

The quantity of alcohol employed in the deoiling procedure can be used to control the amount of unreacted oil remaining with the alcohol-water phase. When more unreacted oil is desired in the sulfonation product, the proportion of isopropyl alcohol should be increased. When less oil is desired, the quantity of alcohol should be decreased. The quantity of alcohol to be employed in a specific instance will vary with a number of factors including the total quantity of unreacted oil present in the neutralized product, the temperature of the product stream in the deoiling chamber, and the desired quantity of unreacted oil in the neutralized deoiled product. With these and similar operating conditions in mind, one of ordinary skill in the art can easily determine the proper quantity of alcohol to be used in a specific application.

After phase separation has occurred in the deoiling chamber, the unreacted oil will be withdrawn through line 20. The second liquid phase containing alcohol-water, sulfonated hydrocarbons, inorganic salts, and the desired quantities of unreacted oil will be withdrawn through line 21 and discharged into the evaporation stage 22. In the evaporation stage, water and alcohol are removed through lines 23, and the dried, neutralized crude product is discharged through line 24.

The constituents of this dual purpose surfactant product can be segregated and identified using standard solvent extraction and qualitative analysis techniques. For convenience and clarity, these constituents will be defined herein in terms of this standard solvent extraction process. Any remaining water and alcohol is first removed from the product by drying. The dried product is then placed in a solution of 85 volume percent isopropyl alcohol and 15 volume percent water. A portion of the sample will be soluble in the solution and a portion will be insoluble. The insoluble portion is filtered from the solution and set aside for further analysis. The solution containing the alcohol-water soluble fraction is then dried to remove the alcohol and water. The dry residue is then placed in pentane. A portion of this residue is insoluble in pentane and is separated from the solution by convenient means such as filtration. Qualitative analysis reveals that this pentane-insoluble constituent is essentially a water-soluble hydrocarbon sulfonate. The pentane-soluble fraction is a hydrocarbon oil having a mass spectrum similar to that of the original feedstock. This fraction appears to be oil which did not react in the sulfonation step.

The fraction of the original sample which is not soluble in the isopropyl alcohol-water solution is then placed in water. A portion is soluble and qualitative analysis reveals that this fraction is essentially inorganic salt, such as $Na_2SO_4$, which was produced by the reaction of excess $SO_3$ and the base during the neutralization step. The constituent which is insoluble in water is essentially a hydrocarbon sulfonate having a relatively high equivalent weight. It should be noted that the water-insoluble sulfonate can be solubilized in water in the presence of the water-soluble, pentane-insoluble sulfonate. Also the unreacted oil which would otherwise be insoluble in water is soluble in the presence of the sulfonated hydro-carbons.

An analysis of a typical dual purpose surfactant in the form of the dried neutralized product is:

TABLE I

Dried Product Composition

| Constituent | Weight Percent |
|---|---|
| Pentane-insoluble sulfonate | 68.4 |
| Oil | 14.1 |
| Inorganic Salt (sodium sulfate) | 11.0 |
| Water-insoluble sulfonate | 6.5 |
| Total: | 100.0 |

As was previously noted, it has been found that the viscosity-imparting properties of these surfactant compositions are related in part to the relative quantities of oil and surfactant present in the surfactant product composition. Moreover, it has been found that these quantities must be kept within limits to produce a satisfactory product for oil recovery. For convenience, the relative quantities of oil and surfactant will be referred to herein as the weight ratio between the oil in the composition to the surface active agents in the composition, i.e., the pentane-insoluble and water-insoluble sulfonates. It has been found that oil/surfactant ratio should be no lower than 0.05 and should be no higher than 0.40 by weight. As will be shown hereinafter the viscosity-imparting properties of the composition are unsatisfactorily low unless the oil/surfactant ratio is kept within the stated limits.

To illustrate the relationship between the oil concentration of the surfactant composition and its viscosity-imparting properties, the surfactant having the composition illustrated in Table I was treated to remove the inorganic salt and the unreacted oil. The inorganic salt was removed using conventional desalting methods, and the oil was then removed from the sample using a dialysis extraction technique. Dialysis is a microfiltration method based on the differing diffusional characteristics of substances across a semi-permeable membrane. In the separation of the oil from the surface active agents of the surfactant composition, a Soxhlet extractor was employed. This conventional extraction apparatus has a separation chamber for holding separation solvents such as pentane, a siphon discharge leading from the separation chamber into a heating flask, a condenser-refluxer for liquefying the vapors which are distilled within the heating flask, and a sample container disposed within the separation chamber. The sample container or Soxhlet thimble is an elongated cup of a porous and permeable paper-like material for holding the surfactant sample. The surfactant sample is placed in a sealed latex membrane which is disposed within the Soxhlet thimble. The thimble itself extends above the liquid level of the solvent and the sample within the latex membrane is below the liquid level line.

In operation, the condensed pentane within the separation chamber permeates the thimble and latex membrane and permits diffusion of the oil from the sample and into the pentane. When the pentane level reaches the siphon height, it automatically discharges into the heating flask where it is distilled and introduced into the condenser-refluxer. The distilled pentane liquefies within the condenser and is reintroduced into the separation chamber. The condensed pentane and oil pass freely through the latex membrane whereas the other components of the sulfonate product do not. Since the oil has a much higher boiling point than the pentane, it concentrates within the heating flask. This analytical technique is an effective separation method; qualitative analysis of the separated oil shows that it is essentially free of sulfonated hydrocarbons.

These dialyzed and desalted surfactant samples were then used to illustrate the effect of oil concentration on the viscosity-imparting properties of the surfactant. An undialyzed whole surfactant sample was added at a concentration of 2 weight percent to water containing 3 percent by weight sodium carbonate. The viscosity of this surfactant solution was then measured in a Wells-Brookfield Micro Viscometer MOdel LVT at a shear rate of 115 reciprocal seconds and a temperature of approximately 25°C. The viscosity of this whole sample was 10.6 centipoise. The surfactant was then desalted and dialyzed in a manner previously described to remove the salt and the unreacted hydrocarbon feedstock from the sample.

A number of dialyzed surfactant solutions were prepared in a similar manner and various concentrations of oil from the original feedstock were added to these solutions. The viscosities of each of these solutions were then measured in the Wells-Brookfield Micro Viscometer. The results of these tests are shown in Table II.

TABLE II

| Surfactant Sample | Apparent Viscosity Measured at 115 Reciprocal Seconds and 25°C Centipoises |
|---|---|
| Dialyzed Sample | 2.8 |
| Dialyzed Sample + 5 wt% Oil | 3.6 |
| Dialyzed Sample + 10 wt% Oil | 3.8 |
| Dialyzed Sample + 20 wt% Oil | 11.5 |
| Dialyzed Sample + 40 wt% Oil | 3.5 |

It should be noted at this point that the viscosities tabulated in Table II are apparent viscosities. These solutions have non-Newtonian fluid behavior. They are pseudo-plastic since their apparent viscosity will decrease with an increase in shear rate, and they are thixotropic since when sheared at a given rate their apparent viscosities will decrease with time.

It is readily apparent from the results tabulated in Table II that the viscosity of an aqueous solution of these dual purpose surfactants can be readily controlled by controlling the quantity of oil contained in the surfactant solution. When the oil concentration is less than 5 percent by weight of the dialyzed sample, the viscosity of the sample is less than 3 centipoise. When the oil concentration is increased to 20 percent, the viscosity of the solution quadruples.

The effect of the oil in increasing the viscosity of the solution is particularly surprising in view of the very minor quantities employed. In the maximum quantity stated the oil is added at a concentration of 40 percent of the dialyzed sample which is added to the aqueous solution at a concentration of 2 percent. In other words, the oil is only 0.8 weight percent of the resultant aqueous solution. Moreover, the maximum viscosity is noted where the oil concentration is only 0.4 percent of the aqueous solution.

While the foregoing investigations were conducted by adding quantities of the original feedstock to the dialyzed sample, it should be noted that comparable results have been obtained by adding extracted, unreacted oil to its dialyzed sample. These tests showed corresponding results. When the oil concentration was less than 5 percent by weight of the dialyzed sample there was essentially no increase in viscosity. The viscosity of the aqueous solution rose to a peak with increasing oil concentrations and then decreased as further quantities of oil were added.

While it is preferred to control the quantity of oil in the surfactant composition by controlling the operating conditions in the deoiling chamber, it is contemplated that other procedural steps can be employed to vary the oil concentration. For example, the dried neutralized crude product can be produced and then analyzed to determine the quantity of oil in the product. If the oil quantity is too low to produce satisfactory viscosities, additional feedstocks can be used to raise the oil concentration to a desired level. If the oil concentration is too high, additional extraction procedures can be employed to reduce the oil concentration to within desired limits.

In many instances, it will be preferred to maintain the oil/surfactant ratio at a level such that aqueous surfactant solution will have a mobility ratio of approximately one with the reservoir oil. To achieve this viscosity, it may be necessary in some cases to add a specific viscosity increasing agent such as a heteropolysaccharide to the surfactant solution. This invention may be useful even in such an instance since less of the specific viscosity increasing agent will be needed to achieve the desired viscosity level. This reduction in the quantity of specific viscosity increasing agent will, of course, improve the economics of the oil recovery method.

In other instances, it may be desired to employ a surfactant solution which has a mobility ratio of less than one with respect to the reservoir oil. Although the sweep efficiency of the surfactant solution would be reduced in such an instance, this lower mobility ratio may be more economical than adding an additional viscosity increasing agent. Again, the benefits of this invention can be realized in such an instance. Although the mobility ratio of the surfactant solution with respect to oil may not be equal to approximately one, the practice of this invention will result in a more viscous surfactant solution. Even though the sweep efficiency may not be at an optimum, it will be improved by the practice of this invention. In certain instances sound reservoir engineering may dictate that the mobility ratio of the surfactant solution with respect to oil should be less than one. This condition could arise where it is desired to reduce fingering by displacing flood water into the surfactant solution. The practice of this invention will permit the operator to achieve this desired viscosity level.

A typical operation in which this invention might be carried out is illustrated by the following example:

A petroleum reservoir is waterflooded in the conventional manner to a residual oil saturation of about 30 percent of the reservoir pore volume. Using standard reservoir techniques, it is determined that a solution containing approximately 2 weight percent surfactant and having a viscosity of approximately 11.5 centipoises at 115 reciprocal seconds could satisfactorily displace oil from this particular reservoir. A surfactant solution is prepared by reacting a petroleum feedstock boiling within the range of 700°–1100°F in a wiped-film reactor. The conditions within the deoiling chamber of the sulfonation process are adjusted to produce a dried neutralized crude product having an oil/surfactant ratio of approximately 0.20. The product is subsequently concentrated and shipped to the field location. The surfactant mixture is added at a concentration of 2 percent by weight based on the pentane-insoluble sulfonate concentration to water containing 3 percent by weight sodium carbonate. The viscosity of the resultant mixture is approximately 11.5 centipoise at 115 reciprocal seconds. The volume of the solution injected into the reservoir is approximately 30 percent of the reservoir pore volume within the area to be swept by the solution. The injected surfactant solution is followed by a 30 percent pore volume bank of flood water containing 0.04 weight percent of a heteropolysaccharide viscosity-increasing agent having a viscosity of approximately 3 centipoises at a shear rate of 230 reciprocal seconds. The surfactant in thickened water banks is then displaced toward a producing well by injection of oil field brine. Displaced reservoir oil is recovered from the producing well.

The principle of the invention and the best mode in which it is contemplated to apply that principle have been described. It is to be understood that the foregoing is illustrative only and that other means and techniques can be employed without departing from the true scope of the invention defined in the following claims.

What is claimed is:

1. A method for recovering oil from a subterranean oil bearing formation by injecting an aqueous solution of hydrocarbon surfactant into said formation which comprises determining a viscosity level for the aqueous surfactant solution to effectively displace the oil, injecting into the formation an aqueous solution of hydrocarbon surfactant having an oil/surfactant weight ratio which is within the range of 0.05 and 0.40 and at a ratio within the range which is sufficient to impart the determined viscosity level to the surfactant solution, displacing the surfactant solution through the formation, and recovering oil from the formation.

2. A method as defined in claim 1 wherein the concentration of said surfactant in said solution is approximately two percent by weight.

3. A method as defined by claim 1 in which said surfactant is prepared by contacting a hydrocarbon feedstock containing at least ten percent by weight of the sulfonatable constituents present in a 700°–1100°F boiling range fraction of a petroleum crude with gaseous $SO_3$ in a thin-film reactor and said oil is an unreacted portion of said hydrocarbon feedstock.

4. A method as defined by claim 1 further comprising adding viscosity increasing agent to the surfactant solution to further increase the viscosity of the solution.

5. A method as defined by claim 1 wherein the surfactant solution exhibits non-Newtonian fluid behavior.

6. A method as defined by claim 5 wherein the non-Newtonian fluid behavior is pseudo-plastic and thixotropic.

* * * * *